United States Patent
Akhtar et al.

(10) Patent No.: US 6,562,314 B2
(45) Date of Patent: May 13, 2003

(54) METHODS OF PRODUCING SUBSTANTIALLY ANATASE-FREE TITANIUM DIOXIDE WITH SILICON HALIDE ADDITION

(75) Inventors: M. Kamal Akhtar, Ellicot City, MD (US); Eric J. Eller, Laurel, MD (US); Nancy L. Fitzgerald, Severna Park, MD (US); Matthew E. Jamison, Jefferson, OH (US); John R. Snider, Annapolis, MD (US)

(73) Assignee: Millennium Inorganic Chemicals, Inc., Hunt Valley, MD (US)

( * ) Notice: Subject to any disclaimer, the term of this patent is extended or adjusted under 35 U.S.C. 154(b) by 0 days.

(21) Appl. No.: 09/789,394

(22) Filed: Feb. 20, 2001

(65) Prior Publication Data

US 2002/0114761 A1 Aug. 22, 2002

(51) Int. Cl.[7] ............................................. C01G 23/047
(52) U.S. Cl. ...................................................... 423/613
(58) Field of Search ................................. 423/613, 614; 106/437

(56) References Cited

U.S. PATENT DOCUMENTS

| | | | | |
|---|---|---|---|---|
| 3,640,745 A | * | 2/1972 | Darr et al. ................... | 423/613 |
| 4,803,056 A | * | 2/1989 | Morris et al. ................ | 423/613 |
| 5,562,764 A | * | 10/1996 | Gonzalez ..................... | 423/613 |
| 6,387,347 B1 | * | 5/2002 | Deberry et al. .............. | 423/613 |

* cited by examiner

Primary Examiner—Steven Bos
(74) Attorney, Agent, or Firm—Kalowv& Springut LLP; David A. Kalow; William D. Schmidt

(57) ABSTRACT

The present invention provides methods of producing substantially anatase-free titanium dioxide by mixing titanium tetrachloride with a silicon compound to form an admixture, and introducing the admixture and oxygen into a reaction zone to produce the substantially anatase-free titanium dioxide. The reaction zone has a pressure of greater than 55 psig.

31 Claims, No Drawings

METHODS OF PRODUCING SUBSTANTIALLY ANATASE-FREE TITANIUM DIOXIDE WITH SILICON HALIDE ADDITION

BACKGROUND OF THE INVENTION

Titanium dioxide ($TiO_2$) is an important pigment in the manufacture of paints, plastics, and coatings. There has been a considerable research effort to make titanium dioxide pigments with desirable properties (i.e., fine particle size, gloss and durability).

One method of manufacturing titanium dioxide is by reacting titanium tetrachloride ($TiCl_4$) with oxygen. This reaction is initiated by heating the gaseous reactants ($TiCl_4$ and oxygen) to temperatures of preferably between 650 and 1200° C. Some prior art references describe reducing these heating requirements by using multi-stage introduction of $TiCl_4$ or oxygen into the reaction zone.

The prior art describes modifying the $TiCl_4$ and oxygen reaction with chemicals to produce pigments with desirable properties. For example, the prior art describes adding aluminum trichloride ($AlCl_3$) with $TiCl_4$ to promote rutile titanium dioxide formation. $AlCl_3$ addition alters the surface chemistry of titanium dioxide; enriching the surface of the titanium dioxide with aluminum (present as the oxide and/or titanate).

It is known that the reaction between $TiCl_4$ and oxygen is highly exothermic and temperatures from the reaction mass range between about 1200 and about 2000° C. These high temperatures can lead to undesired growth and agglomeration of titanium dioxide particles reducing pigmentary value. This undesired growth of titanium dioxide is exacerbated at high production rates, high temperatures and high pressures.

In conventional manufacturing processes, the undesired growth of titanium dioxide is prevented by rapidly cooling the reaction mass to below 600° C. This is accomplished by passing the reaction products through a conduit, "flue", which is externally cooled by water. The hot pigment tends to stick to the flue walls causing a build up. This build up can be reduced or eliminated by introducing scouring particles or scrubs materials. Some examples of scrubs material include NaCl, KCl, sand, and the like. The cooled titanium dioxide is separated from the gases by filtration and then dispersed in water for further processing.

$TiO_2$ dioxide pigment properties, such as iron oxide undertone (IOU) and gloss, are a function of particle size distribution and particle agglomeration, respectively. When highly agglomerated $TiO_2$ is formed, it must be milled in an expensive, energy-intensive process such as sand-milling or micronizing to achieve the desired particle size. The energy consumption and intensity of grinding or milling agglomerates depends not only on the number of agglomerates present but also on their strength, that is, how strongly the primary or individual titanium dioxide particles are bonded to each other.

One way to reduce particle size and agglomerates is to add a silicon halide (i.e. silicon tetrachloride). The reaction between silicon tetrachloride ($SiCl_4$) and oxygen results in the formation of silica. Silica reduces the sintering rate of titania and results in smaller particles and fewer agglomerates with weak bonds.

Unfortunately, silicon halide addition promotes unwanted anatase formation in titanium dioxide. Out of the two commercially significant crystal modifications of titanium dioxide (i.e., anatase and rutile), the anatase form is photochemically more active and hence, less durable. Even 1% anatase in rutile titanium dioxide is detrimental to the durability of the pigment. Rutile is further preferred due to its higher refractive index. Thus, it is desirable to produce essentially anatase-free titanium dioxide with a rutile content of at least 99.8% or higher.

The anatase promoting effect of silicon compounds has been countered in the prior art by using high levels of aluminum chloride. For example, $TiCl_4$ is premixed with silicon species and volatile alumina (i.e., $AlCl_3$) before entering the reaction zone. It takes temperatures of between 1000 and 1200° C., to form about 90% rutile titanium dioxide in this process. However, aluminum halide consumption is increased causing a higher production cost.

Premixing $SiCl_4$ and $AlCl_3$ with $TiCl_4$ to make high surface area titania in hydrogen flames is described in the prior art. The pigment produced is used for catalytic, sunscreen, and cosmetic applications.

Adding certain conditioning agents like silicon and aluminum halides is also described in the prior art. The use of these conditioning agents can be minimized by using multiple stages of $TiCl_4$ addition. However, the conditioning agents are premixed only in the first stage. This scheme, with $SiCl_4$, results in smaller titania particle size and greater than 97% rutile content.

Some prior art references describe improving particle size and titania tint tone by separately adding between 0.01 and 8% $SiCl_4$ to the $TiCl_4$ stream and between 0.00001 and 4% alkali salt to the oxygen stream. Some silicon sources used are silicon halides, silanes, alkylalkoxysilanes, alkylsilic esters or ethers, and derivatives of silicic acid.

Delayed introduction of silicon compounds into the reactor is also described in the prior art. In this case, the silicon compound is introduced separately after the $TiCl_4$ and oxygen have been introduced into the reactor. This process results in smaller titanium dioxide particles.

The prior art describes silicon compound addition after the reaction of $TiCl_4$ and oxygen is substantially complete. In this case, after $TiCl_4$ and oxygen are reacted, the resulting $TiO_2$ is coated by suspending pigment in a gas stream and then reacting steam and silicon or aluminum compounds on the surface of titanium dioxide.

Other prior art references describe adding silicon halides into the flue after the reaction between $TiCl_4$ and oxygen is initiated. This overcomes the anatase promoting effects of silicon and yields smaller particles. Since the silicon compound is added after the reaction is substantially complete, higher amounts of silicon compound are needed to achieve the same degree of particle size reduction than in the case where silicon compounds are added prior to the reaction. Moreover, the delayed addition of silicon halide leads to most of the silica residing on the outer surface of titania particle or as discrete silica particles. This alters the particle surface chemistry and can increase difficulty in dispersing the pigment in an aqueous medium.

Based on the foregoing, the need exists for processes of producing substantially anatase-free titanium dioxide (rutile content of at least 99.8%) having optimum pigmentary size at high production rates and operating pressures. Premixing silicon compounds and titanium tetrachloride together and then reacting them with oxygen at pressures in excess of 55 psig provides a means of manufacturing substantially-anatase free titanium dioxide with reduced particle size and controlled surface chemistry. This is achieved without increasing processing temperature or aluminum chloride feed and reduces or eliminates the need for scrubs material.

SUMMARY OF THE INVENTION

The present invention provides methods of producing substantially anatase-free titanium dioxide by introducing a silicon compound into the $TiCl_4$ stream to form an admixture, before reaction with oxygen. The admixture which comprises titanium tetrachloride and the silicon compound is introduced into a reaction zone with oxygen to produce the substantially anatase-free titanium dioxide, where the reaction zone has a pressure of greater than 55 psig.

In one embodiment, the present invention provides a method of producing substantially anatase-free titanium dioxide, comprising: a) mixing titanium tetrachloride with silicon tetrachloride and aluminum trichloride to form an admixture; and b) introducing the admixture and oxygen into a reaction zone to produce the substantially anatase-free titanium dioxide, wherein the reaction zone has a pressure of about 70 psig.

In another embodiment, the present invention provides a method of producing substantially anatase-free titanium dioxide in a multi-stage reactor having a plurality of reaction zones, the method comprising a) mixing titanium tetrachloride with a silicon compound to form one or more admixtures; and introducing one admixture or a portion thereof, and oxygen into each reaction zone of the multistage reactor to produce the substantially anatase-free titanium dioxide, wherein each reaction zone is at a pressure greater than 55 psig.

The methods of the present invention are different from prior art where mixing of $TiCl_4$ with a silicon compound resulted in some anatase titanium dioxide formation. The present invention includes reacting a silicon compound at higher pressures (greater than 55 psig). Using high pressure with a silicon compound results in substantially anatase-free $TiO_2$ (rutile content of at least 99.8%) with reduced particle size, less silicon and aluminum chloride use throughout the process, reduces or eliminates the need for scrubs, without increasing operating temperature.

The reduction in particle size results in improved IOU and gloss. Further, the energy consumption and intensity of milling to achieve product size and gloss targets are reduced than in the process without use of the present invention. It has also been found that this improvement permits higher titanium dioxide output than would otherwise be possible while maintaining the desired particle size targets. It has further been found that the need for scrubs introduced into the cooling conduit is reduced or eliminated.

For a better understanding of the present invention together with other and further embodiments, reference is made to the following description taken in conjunction with the examples, the scope of which is set forth in the appended claims.

DETAILED DESCRIPTION OF THE INVENTION

In preparing the preferred embodiments of the present invention, various alternatives may be used to facilitate the objectives of the invention. These embodiments are presented to aid in an understanding of the invention and are not intended to, and should not be construed to, limit the invention in any way. All alternatives, modifications and equivalents that may become obvious to those of ordinary skill upon a reading of the present disclosure are included within the spirit and scope of the present invention.

This disclosure is not a primer on $TiO_2$ pigment production or on the design nor manufacture of oxidation reactors, basic concepts known to those skilled in the field of $TiO_2$ production have not been set forth in detail. Concepts such as choosing appropriate reactor manufacturing materials, or appropriate additives for the oxidation reaction producing titania pigment, or suitable conditions for typical operation of oxidation-type reactors are readily determinable by those skilled in the industry and are generally described in the prior art. Attention is therefore directed to the appropriate texts and references known to those skilled in the art in regard to these matters.

The present invention provides methods of producing substantially anatase-free titanium dioxide that includes mixing $TiCl_4$ with a silicon compound to form an admixture; and introducing the admixture and oxygen into a reaction zone to produce the substantially anatase-free titanium dioxide, where the reaction zone has a pressure of greater than 55 psig. More particularly, the method of the present invention includes adding a silicon compound to the $TiCl_4$ stream before it enters the reaction zone to react with oxygen.

Methods for producing titanium dioxide pigment by reacting $TiCl_4$ and oxygen in a reaction zone in a reactor are well known to those skilled in the art. The reaction between $TiCl_4$ and oxygen at elevated temperatures is extremely fast and yields titanium dioxide. This reaction between $TiCl_4$ and oxygen occurs in at least one reaction zone in a reaction vessel.

Different reactor configurations with multiple $TiCl_4$ feed streams have been used to control $TiO_2$ particle growth as described in U.S. Pat. No. 6,387,347, the entire disclosure is incorporated by reference. With a view to practicing the present invention, any conventional type of corrosion resistant reaction vessel may be employed. The vessel must be of such design, construction and dimension that preferably a continuous flow of reactants and products within and through the reaction zone(s) will be afforded and such control over the velocities, mixing rates, temperatures, and thus residence time distributions, will be permitted.

A typical reactor useful to practice the methods of the present invention may include a combustion chamber for preheating reactants and other such associated equipment as may be necessary for the safe operation to produce titania from $TiCl_4$ and an oxygen containing gas according to the present invention. Preferred reactors suitable for use in the present invention include single stage and multistage reactors, with multistage reactors being most preferred. Multistage reactors have multiple inlet points and multiple reaction zones for introduction of reactants.

The growth of titanium dioxide occurs simultaneously with the reaction between $TiCl_4$ and oxygen in the reaction zone. The $TiCl_4$ and oxygen reaction takes place for a very brief period (between 0.5 and 30 milliseconds) till the $TiO_2$ product stream is rapidly cooled by heat transfer through the walls of the pipe; for example, a flue immersed in water.

In the manufacture of titanium dioxide from $TiCl_4$ and oxygen, preferably, $TiCl_4$ is heated and vaporized at temperatures between about 250° C. and about 400° C. The hot $TiCl_4$ gas is further heated to preferred temperatures of between about 300° C. to about 650° C. by passage through the aluminum halide (i.e. aluminum chloride) generator. The heat of reaction between aluminum and halide is released and heats the $TiCl_4$. Preferably, at the same time the aluminum halide (i.e., aluminum chloride-equivalent to from about 0.1 to about 10% aluminum oxide on titanium dioxide pigment) is introduced into the $TiCl_4$ stream. Suitable aluminum halides include $AlCl_3$, $AlBr_3$ and $AlI_3$, and the like.

Oxygen-containing gases are preheated to preferably between about 600° C. and about 1000° C. by means known in the art. The oxygen containing gas is then intimately mixed with $TiCl_4$ (preferably premixed with the aluminum halide) at the reaction zone. Depending on the preheating process employed, the stream of oxygen containing gas feeding the reactor may be dry and relatively pure, but typically contains between about 50 ppm and about 200,000 ppm of water vapor based on the weight of $TiO_2$ produced as would be known to the skilled artisan. Suitable oxygen containing gases include air, oxygen-enriched air, or substantially pure oxygen. The oxygen and $TiCl_4$ can both be introduced into reaction zone using one or more entry points using methods known in the art.

The temperature in the reaction zone ranges between about 800° C. and about 2000° C. Preferably, the temperature range in the reaction zone is between about 850° C. and about 1600° C., more preferably, between about 900° C. and about 1800° C. and most preferably, between about 1200° C. and about 1800° C.

Pressure in the reaction zone is between about 5 and about 100 psig. Preferably, the reaction zone pressure is between about 20 and about 75 psig and more preferably, between about 55 to about 75 psig.

When multi-stage reactors are used, the oxygen containing gas may be introduced into the first and/or subsequent reaction zone of the multi-stage vapor-phase reactor by any suitable means, such as a stream of oxidizing gas from a combustion chamber. The total quantity of oxygen added must be sufficient to fully react with the total quantity of $TiCl_4$ added to all of the reaction zones of the reactor.

The $TiCl_4$ and oxygen reaction can be carried out in the presence of alkali additives like CsCl and KCl and water vapor as disclosed in the prior art. Due to the high temperature and rapid mixing of $TiCl_4$ and oxygen, oxygenolysis of $TiCl_4$ results in the formation of fine solid particles of rutile titanium dioxide and the liberation of the halogen (i.e. chlorine). The solid suspension of titanium dioxide in the halogen (i.e. chlorine) and other diluent gases is at temperatures in excess of about 1500° C. due to the exothermic nature of the reaction. This mixture is cooled in a water-cooled flue as described in the prior art.

Granular scouring particles or scrubs material, for instance, sodium chloride, potassium chloride, sand or calcined $TiO_2$ are added to the flue to scrape away the deposits of $TiO_2$ on the internal surface of the flue pipe as described in the prior art. The cooled pigment is separated from the halogen (i.e. chlorine) and other gases by filtration or other gas-solid separation techniques known by those skilled in the art and dispersed in water.

The present invention includes mixing a silicon compound with the $TiCl_4$ stream to form an admixture before reacting the $TiCl_4$ with an oxygen containing gas in the reaction zone. Preferably, the $TiCl_4$ stream is vaporized by passage through a vaporizer where it is externally heated to between about 250 and about 400° C. by methods known in the art.

It is contemplated by the methods of the present invention that the oxygen containing gas can be added into the reaction zone before, during or after the silicon compound and $TiCl_4$ admixture is added.

Preferably an aluminum halide is mixed with the $TiCl_4$ and silicon compound admixture before reaction with oxygen in the reaction zone. Typically, this is accomplished by heating the $TiCl_4$ gas to between about 400 and about 550° C. and then passing it through the aluminum halide (i.e., aluminum chloride) generator. The heat of reaction between aluminum and chlorine is released and heats the $TiCl_4$ further.

In multistage reactors with a plurality of reaction zones, the $TiCl_4$ stream with preferably, between about 0.1 to 10% aluminum halide is divided into two or more sub-streams before entering the reaction zone. The silicon compound is added to one or more or all of these sub-streams of $TiCl_4$. One example of a multistage reactor suitable for use in the present invention is described in U.S. Pat. No. 6,387,347.

The temperature in the reaction zone when $TiCl_4$ and silicon compound are introduced into the reactor is dependent on the reactor design and flow rate. Any suitable means of raising the temperature of the reactants in the reaction zone can be employed. The temperature in the reaction zone ranges between about 800° C. and about 2000 ° C. Preferably, the temperature range in the reaction zone is between about 850° C. and about 1600° C., more preferably, between about 900° C. and about 1800° C. and most preferably, between about 1200° C. and about 1800° C.

Pressure in the reaction zone is between about 5 and about 100 psig. Preferably the reaction zone pressure is between about 20 and about 75 psig and more preferably, between about 55 to about 75 psig.

The amount of the silicon compound added to the $TiCl_4$ stream will depend on the operating temperatures, pressures and, on the extent of particle size reduction desired. Preferably, the amount of silicon compound added to the $TiCl_4$ stream is between about 0.01% and about 3% based on $SiO_2$ in the final titanium dioxide and the preferred range is between about 0.05% and about 0.5%.

Suitable silicon compounds for use in the present invention include silicon halides, for example, $SiBr_4$, $SiF_4$, $SiI_4$, $SiCl_4$; alkylalkoxysilanes, for instance, TMOS; silane ($SiH_4$) and derivatives of silane; alkylsilic esters or ethers, and derivatives of silicic acid. Any low melting point compound of silicon can be used as long as it is converted to silicon dioxide under the reaction conditions specified herein. It is preferred that $SiCl_4$ be used.

The physical parameters of each reaction zone are adjusted for anticipated process conditions by those skilled in the art to achieve the desired percent conversion of titanium tetrachloride at the end of that reaction zone. Generally, mean residence times of less than 30 milliseconds are preferred in the first or intermediate reaction zone, with times between 0.5 and 20 milliseconds being more preferred.

Typically, the residence time in each reaction zone is a complex function of mixing intensity, density of gases and temperature profiles. Further, since mixing is not instantaneous, there is a distribution of temperatures and reactant conversions across the reaction zone for a given mean residence time. These parameters may be calculated using equations well known in the art of fluid mechanics and kinetic theory.

Mixing rates between the reactants may be used to adjust the extent of titanium tetrachloride conversion achieved by controlling the flow of $TiCl_4$ into the reaction zone. The flow may be controlled by, for example, adjusting the width of the slots or orifices through which $TiCl_4$ enters a reaction zone. As one of ordinary skill will understand, provided there is sufficient energy to drive the reaction rapidly, an increase in slot width will generally decrease the initial mixing rates of the reactants and broaden the distribution of conversion of the reactants across the reactor cross section. Decreased mixing will delay the reaction, which will decrease both the maximum temperature in the reactor and the time the newly formed titania is exposed to that temperature in that reaction stage.

As a result of the intimate mixing between preferably $TiCl_4$, $AlCl_3$, $SiCl_4$ and oxygen, titanium dioxide with aluminum oxide and silicon dioxide is formed. The silicon dioxide may be incorporated within the titanium dioxide crystal lattice or dispersed as a coating admixed with some titanium dioxide, aluminum oxide and aluminum titanate. The amount of silicon dioxide or silicon containing compounds on the surface of titanium dioxide is a function of total amount of $SiCl_4$ added, reactor temperature and residence time.

The titanium dioxide formed in the processes of the present invention is substantially anatase-free which means that the $TiO_2$ is essentially at least 99.8% rutile, free from the anatase form of $TiO_2$. Most preferably, the $TiO_2$ is at least 99.9% free from the anatase form of $TiO_2$.

The substantially anatase-free titanium dioxide of the present invention is produced at production rates of preferably from about 13.5 metric tons to about 30 metric tons per hour. However, the present invention contemplates higher and lower production rates.

In the most preferred embodiment, the present invention provides methods for producing substantially anatase-free $TiO_2$ which comprises: reacting $TiCl_4$ (premixed with aluminum chloride) and an oxygen-containing gas in the vapor phase at a reaction temperature of at least about 650° C. The reaction pressure is between about 5 and 100 psig, preferably between about 55 and about 75 psig. The $TiCl_4$ (premixed with aluminum chloride) and oxygen is reacted in the presence of water vapor in the amount between 50 and 200,000 ppm (based on weight of titanium dioxide being produced). Optionally, a growth retardant is added comprising any of the alkali metal halides in the amount between about 2 and about 3000 ppm based on titanium dioxide being produced. Some alkali metal halides include halides of Li, Na, K, Rb, Cs, and the like. The titanium tetrachloride is then introduced into the reaction zone in at least two or more stages, where the amount of titanium tetrachloride to the first stage is between about 10% and about 90% of the total flow (preferably, between about 30% and about 70%). The residence time of the reactants in the first stage of the reactor is between about 0.5 and about 20 milliseconds and the mean temperature in the first stage is between about 800° C. and about 1200° C. The mean temperature in later stages is between about 1000° C. and about 1400° C. Particle growth in the first, second or subsequent stages is controlled preferably by adding liquid silicon halide to the hot gaseous titanium tetrachloride (premixed with aluminum chloride), letting silicon halide vaporize and enter the reactor along with titanium tetrachloride. The amount of silicon halide added is between about 0.01% and about 3%, more preferably between about 0.05% to about 0.5% as $SiO_2$ based on the total weight of pigment produced.

For a pigment to disperse effectively in an aqueous medium without flocculation, the pigment isoelectric point has to be as far removed from the pH of the aqueous medium. The details of pigment dispersion and the factors affecting dispersion are discussed in Dispersion of Powders in Liquids, ed. G. D. Parfitt, Applied Science Publishers (1981). Due to the presence of chlorine, the water in which the titanium dioxide is dispersed is acidic with pH in the range of about 1 to about 4. The isoelectric point of the titanium dioxide in the absence of silicon compound addition is between 6 and 8 and titanium dioxide remains well dispersed in the water without flocculation even at solids content between about 20% and about 50%. The isoelectric point of silica is 2.2 (R. E. Day in The Characterization of the Surface of Titanium Dioxide Pigments, Progress in Organic Coatings, Vol. 2 (1973/74) pg. 269–288). The introduction of surface silica on titanium dioxide will result in decrease in the isoelectric point of the titanium dioxide. This either results in pigment flocculation or uneconomical operation at low solids in the titanium dioxide slurry.

In the preferred process of this invention, the intimate mixing of $TiCl_4$ and silicon compound (i.e., $SiCl_4$) in two or more stages results in minimization of surface silica. The isoelectric point is reduced only from about 6.5 to about 4.5 and titanium dioxide is easily processed.

When silicon is added after contact between $TiCl_4$ and oxygen and the conversion of $TiCl_4$ to $TiO_2$ is essentially complete, surface silica is formed and decreases the isoelectric point to 2.2, that of essentially pure silica.

While not being bound to any particular theory with respect to the present invention, the addition of silicon compounds (i.e., $SiCl_4$) in the $TiCl_4$ stream results in the formation of silica which reduces the sintering rates of titania. The reduction in sintering rates results in weaker bonds holding the agglomerates of titanium dioxide together. This results in agglomerates that are softer as opposed to hard agglomerates formed in the absence of the silicon compound. The soft agglomerates with their ease of breakup also lead to a decrease in fraction of particles greater than 0.5 μm. This is an important consideration as these large particles cause "grit" in paints and lead to loss of gloss.

Hard agglomerates include agglomerates of primary particles of titanium dioxide that are difficult to break up and require expenditure of more energy. A measure of ease of break up is the power consumption in sand milling operations or steam to pigment ratio in fluid energy mills to achieve the same standard gloss in a latex paint film. Hard agglomerates need more power or more steam to reach the gloss levels than would be needed by agglomerates made by the process of this invention.

Soft agglomerates include agglomerates of primary particles of titanium dioxide that are easy to break up and require less energy. Soft agglomerates would require less power during milling operations and lower steam to pigment ratio during fluid energy milling to achieve the same degree of gloss than those agglomerates produced without premixing $SiCl_4$ with the $TiCl_4$.

The titanium dioxide pigment is separated from the gases by conventional techniques like electrostatic precipitation, cyclonic means or passage through a porous media. The recovered titanium dioxide is subjected to further treatment where it is mixed with additional chemicals, ground, dried and milled to attain the desired levels of pigment performance.

The methods of the present invention provide several improvements over the prior art in the manufacturing of titanium dioxide from $TiCl_4$. These improvements include:
  (i) reduction of particle size with reduced consumption of $SiCl_4$ and $AlCl_3$
  (ii) substantially no anatase contamination in the titanium dioxide product (less than about 0.2%);
  (iii) reduction or elimination of the amount of scrubs in the cooling conduit or flue; and
  (iv) the ease of milling increased due to more soft agglomerates.

Having now generally described the invention, the same may be more readily understood through the following reference to the following examples, which are provided by way of illustration and are not intended to limit the present invention unless specified.

EXAMPLES

The following examples are presented to aid in an understanding of the present invention and are not intended to, and should not be construed to, limit the invention in any way. All alternatives, modifications and equivalents that may becomes obvious to those of ordinary skill in the art upon a reading of the present disclosure are included within the spirit and scope of the invention.

The examples below show that as pressure in the reaction zone is increased, rutile content of the $TiO_2$ pigment also increases resulting in substantially-anatase-free $TiO_2$ pigment with a rutile content of at least 99.8%. Further, premixing $SiCl_4$ with $TiCl_4$ before reacting the admixture with oxygen under pressure results in $TiO_2$ pigment that is substantially anatase-free (rutile content of at least 99.8%) with reduced particle size.

Test Methods

Isoelectric Point

The isoelectric point of the titanium dioxide was measured by titrating the slurry in a particle surface charge detector PCD 03 pH, Mutek Analytic GmbH, Herrsching, Germany.

Particle Size

Particle size distribution is measured by laser light scattering using Mie theory to calculate an "equivalent spherical diameter." The measurements are conducted on a Perkin-Elmer Lamda 20 Spectrometer. The titanium dioxide is dispersed in aqueous solution of tetrasodium pyrophosphate and a fixed level of sonication.

Example 1

$TiCl_4$ was preheated and introduced into the reactor. The $AlCl_3$ in the mixture provided 5.8 percent by weight of $Al_2O_3$ on reaction with oxygen based on the weight of $TiO_2$ formed. This $TiCl_4/AlCl_3$ mixture was split into two streams by means of flow control devices. The first stream was introduced into the first reaction zone through a first reactor stage $TiCl_4$ nozzle. Simultaneously, preheated oxygen was introduced into the reactor through a separate inlet into the reaction zone. About 0.56 wt % $SiCl_4$ ($SiO_2$ by weight of $TiO_2$) was added to one of the $TiCl_4$ streams prior to contact with oxygen. The reactor pressure was about 14 psig. The suspension of $TiO_2$ formed was introduced into a flue pipe. The $TiO_2$ was separated from cooled gaseous products by filtration. The product $TiO_2$ was examined for particle size and percent rutile. The mean particle size was 0.118 μm. The rutile content was 96.5 percent, that is, 3.5 percent anatase was present.

Example 2

$TiCl_4$ was preheated to 350° C., mixed with chlorine and passed through a bed containing aluminum. The rate of $TiCl_4$ feed corresponded to a $TiO_2$ production rate of 14.5 metric tons per hour (mtph). The exothermic reaction between chlorine and aluminum generated aluminum chloride and heat. The heat of reaction raised the temperature of the $TiCl_4/AlCl_3$ mixture to about 450–460° C. at the point of entry into the reactor. The $AlCl_3$ in the mixture provided one percent by weight of $Al_2O_3$ on reaction with oxygen based on the weight of $TiO_2$ formed. This $TiCl_4/AlCl_3$ mixture was split into two streams by means of flow control devices. The first stream was introduced into the first reaction zone through a first reactor stage $TiCl_4$ slot. Simultaneously, preheated oxygen having been further heated by hydrocarbon combustion to about 1500° C. was introduced into the reactor through a separate inlet into the reaction zone. Trace amounts of KCl dissolved in water were sprayed into the hot oxygen stream. The reactor pressure was about 70 psig. The suspension of $TiO_2$ formed was introduced into a flue pipe containing scrubs. The amount of scrubs (i.e., sodium chloride) used was about 1.8% of the $TiO_2$ produced. The $TiO_2$ was separated from cooled gaseous products by filtration. The product $TiO_2$ was examined for particle size distribution, percent rutile, and isoelectric point. The mean particle size was 0.338 μm with a standard deviation of 1.405. The rutile content was greater than 99.8 percent and the pH at the isoelectric point was 6.2.

Example 3

The process of Example 2 was repeated except that 0.22% $SiCl_4$ ($SiO_2$ by weight of $TiO_2$) was added to the $TiCl_4$ stream prior to reaction with oxygen. The amount of scrubs (i.e., sodium chloride) used was about 0.8% of the $TiO_2$ produced. The product $TiO_2$ was examined for particle size distribution, percent rutile, and isoelectric point. The mean particle size was 0.328 μm with a standard deviation of 1.404. The rutile content was greater than 99.8 percent and the pH at the isoelectric point was 5.2.

Example 4

The process of Example 3 was repeated except that 0.33% $SiCl_4$ ($SiO_2$ by weight of $TiO_2$) was added to the $TiCl_4$ stream prior to reaction with oxygen. The amount of scrubs i.e., (i.e., sodium chloride) used was about 0.6% of the $TiO_2$ produced. The product $TiO_2$ was examined for particle size distribution, percent rutile, and isoelectric point. The mean particle size was 0.315 μm with a standard deviation of 1.407. The rutile content was greater than 99.8 percent and the pH at the isoelectric point was 4.9.

Example 5

The process of Example 2 was repeated at 13.5 mtph and a reactor pressure of 70 psig the amount of scrubs (i.e., sodium chloride) used was about 1.9% of the $TiO_2$ produced. The product $TiO_2$ was examined for particle size distribution, percent rutile, and isoelectric point. The mean particle size was 0.312 μm with a standard deviation of 1.401. The rutile content was greater than 99.8 percent and the pH at the isoelectric point was 6.1.

Example 6

The process of Example 5 was repeated except that 0.21% % $SiCl_4$ ($SiO_2$ by weight of $TiO_2$) was added to the $TiCl_4$ stream prior to reaction with oxygen. The amount of scrubs (i.e., sodium chloride) used was about 0.7% of the $TiO_2$ produced. The product $TiO_2$ was examined for particle size distribution, percent rutile, and isoelectric point. The mean particle size was 0.312 μm with a standard deviation of 1.401. The rutile content was greater than 99.8 percent and the pH at the isoelectric point was 4.8.

Example 7

It is contemplated that the process of Example 5 will be repeated except that 1.1% % $SiCl_4$ ($SiO_2$ by weight of $TiO_2$)

will be added to the TiCl$_4$ stream prior to reaction with oxygen. The amount of scrubs (i.e., sodium chloride) will be eliminated. The product TiO$_2$ will be examined for particle size distribution, percent rutile, and isoelectric point. The mean particle size is estimated to be at 0.278 μm with a standard deviation of 1.424. The rutile content is estimated to be greater than 99.8 percent and the pH at the isoelectric point is estimated to be 4.6.

Having thus described and exemplified the invention with a certain degree of particularity, it should be appreciated that the following claims are not to be so limited but are to be afforded a scope commensurate with the wording of each element of the claim and equivalents thereof.

What is claimed:

1. A method of producing substantially anatase-free titanium dioxide comprising
    a) mixing titanium tetrachloride with a silicon compound to form an admixture; and
    b) introducing the admixture and oxygen into a reaction zone to produce the substantially anatase-free titanium dioxide, wherein the reaction zone has a pressure of greater than 55 psig to about 100 psig.
2. A method according to claim 1, wherein the silicon compound is silicon tetrachloride.
3. A method according to claim 1, wherein the substantially anatase-free titanium dioxide comprises 99.9% rutile titanium dioxide.
4. A method according to claim 1, wherein the reaction zone pressure is greater than 65 psig.
5. A method according to claim 1, wherein the reaction zone pressure is from about 65 psig to about 100 psig.
6. A method according to claim 5, wherein the reaction zone pressure is about 70 psig.
7. A method according to claim 1, wherein the reaction zone has a temperature of from about 850° C. to about 1600° C.
8. A method according to claim 1, wherein the reaction zone has a temperature of about 900° C.
9. A method according to claim 1, wherein the admixture has a temperature of at least 300° C.
10. A method according to claim 2, wherein the silicon tetrachloride is added in an amount of from about 0.2% to about 3.0% by weight of SiO$_2$ based on the total weight of the titanium dioxide produced.
11. A method according to claim 2, wherein the silicon tetrachloride is added in an amount of from about 0.5% to about 3.0% by weight of SiO$_2$ based on the total weight of the titanium dioxide produced.
12. A method according to claim 1, further comprising adding an aluminum halide to the admixture.
13. A method according to claim 12, wherein the aluminum halide is aluminum trichloride.
14. A method according to claim 1, wherein the substantially anatase-free titanium dioxide is produced at a production rate of from about 13.5 metric tons to about 30 metric tons per hour.
15. A method according to claim 1, wherein the reaction zone has multiple stages.
16. A method of producing substantially anatase-free titanium dioxide comprising
    a) mixing titanium tetrachloride with silicon tetrachloride and aluminum trichloride to form an admixture; and
    b) introducing the admixture and oxygen into a reaction zone to produce the substantially anatase-free titanium dioxide, wherein the reaction zone has a pressure of about 70 psig.
17. A method of producing substantially anatase-free titanium dioxide in a multistage reactor having a plurality of reaction zones, the method comprising
    a) mixing titanium tetrachloride with a silicon compound to form one or more admixtures; and
    b) introducing one admixture or a portion thereof, and oxygen into each reaction zone of the multistage reactor to produce the substantially anatase-free titanium dioxide, wherein each reaction zone is at a pressure of greater than 55 psig to about 100 psig.
18. A method according to claim 17, wherein the silicon compound is silicon tetrachloride.
19. A method according to claim 17, wherein the substantially anatase-free titanium dioxide comprises 99.9% rutile titanium dioxide.
20. A method according to claim 17, wherein the pressure of each reaction zone is greater than 65 psig.
21. A method according to claim 17, wherein the pressure of each reaction zone is from about 65 psig to about 100 psig.
22. A method according to claim 21, wherein the pressure of each reaction zone is about 70 psig.
23. A method according to claim 17, wherein each reaction zone has a temperature from about 850° C. to about 1600° C.
24. A method according to claim 17, wherein each reaction zone has a temperature of about 900° C.
25. A method according to claim 17, wherein each admixture has a temperature of at least 300° C.
26. A method according to claim 18, wherein silicon tetrachloride is added in an amount of from about 0.2% to about 3.0% by weight of SiO$_2$ based on the total weight of the titanium dioxide produced.
27. A method according to claim 18, wherein the silicon tetrachloride is added in an amount of from about 0.5% to about 3.0% by weight of SiO$_2$ based on the weight of the titanium dioxide produced.
28. A method according to claim 17, further comprising adding an aluminum halide to each admixture.
29. A method according to claim 28, wherein the aluminum halide is aluminum trichloride.
30. A method according to claim 17, wherein each stage of the multistage reactor has a mean residence time of less than about 30 milliseconds.
31. A method according to claim 30, wherein the mean residence time in each stage is less than about 20 milliseconds.

* * * * *